United States Patent
Kim

(10) Patent No.: US 7,902,995 B2
(45) Date of Patent: Mar. 8, 2011

(54) REMOTE METER-READING SYSTEM AND METHOD USING DUPLICATED DATA TRANSMISSION OF PACKET DATA TRANSMISSION AND CIRCUIT DATA TRANSMISSION

(75) Inventor: Young-Duk Kim, Seoul (KR)

(73) Assignee: Nuri Telecom Co., Ltd. (KR)

( * ) Notice: Subject to any disclaimer, the term of this patent is extended or adjusted under 35 U.S.C. 154(b) by 1103 days.

(21) Appl. No.: 11/571,070

(22) PCT Filed: Jun. 30, 2004

(86) PCT No.: PCT/KR2004/001601
§ 371 (c)(1),
(2), (4) Date: Dec. 21, 2006

(87) PCT Pub. No.: WO2006/004231
PCT Pub. Date: Jan. 12, 2006

(65) Prior Publication Data
US 2007/0176789 A1    Aug. 2, 2007

(51) Int. Cl.
*G08C 15/06* (2006.01)
(52) U.S. Cl. ............... 340/870.02; 379/106.03; 455/67.1
(58) Field of Classification Search ............. 340/870.02; 379/106.03; 455/67.1
See application file for complete search history.

(56) References Cited

U.S. PATENT DOCUMENTS

| | | | |
|---|---|---|---|
| 3,973,240 A * | 8/1976 | Fong | 375/212 |
| 5,235,619 A * | 8/1993 | Beyers et al. | 375/260 |
| 6,333,975 B1 * | 12/2001 | Brunn et al. | 379/106.03 |
| 6,344,749 B1 | 2/2002 | Williams | |
| 6,614,802 B1 * | 9/2003 | Garland et al. | 370/465 |
| 6,639,939 B1 * | 10/2003 | Naden et al. | 375/140 |

FOREIGN PATENT DOCUMENTS

| | | |
|---|---|---|
| JP | 19940037915 | 2/1994 |
| KR | 1020030027975 | 4/2003 |
| KR | 1020030034326 | 5/2003 |

OTHER PUBLICATIONS

PCT International Search Report; PCT/KR2004/001601; Date: Mar. 26, 2005.

* cited by examiner

*Primary Examiner* — Timothy Edwards, Jr.
(74) *Attorney, Agent, or Firm* — Cantor Colburn LLP

(57) ABSTRACT

A remote meter-reading system and method for transmitting data measured by a meter using duplicate transmission via packet data transmission and circuit data transmission are provided. The remote meter-reading method includes reading meter-reading data from an electronic watt-hour meter when a predetermined meter-reading time is encountered; packetizing the meter-reading data and unique ID information of the electronic watt-hour meter into a predetermined format and transmitting them to a remote meter-reading server; receiving and managing the meter-reading data from the electronic watt-hour meter and checking whether there is any data that has not been received; when there is data that has not been received within a predetermined time, managing a front end processor (FEP) to set a line according to the circuit data transmission; reading necessary meter-reading data from the electronic watt-hour meter; and transmitting the necessary meter-reading data to the remote meter-reading server through the previously set line.

3 Claims, 5 Drawing Sheets

REMOTE METER-READING SYSTEM AND METHOD USING DUPLICATED DATA TRANSMISSION OF PACKET DATA TRANSMISSION AND CIRCUIT DATA TRANSMISSION

TECHNICAL FIELD

The present invention relates to a remote meter-reading system for measuring an amount of used resource (e.g., electricity, gas, water, hot water, heating flow, or cooling flow) provided to a household or a place of business (hereinafter, referred to as a "consuming place") and an operating state, and more particularly, to a remote meter-reading system and method for transmitting data measured by a meter to a remote meter-reading server using a duplicate data transmission via packet data transmission and circuit data transmission.

BACKGROUND ART

In order to sustain life and perform activities of daily living in a household or a place of business, people need various resources such as electricity, gas, water, and hot water. It is much more economical to produce these resources in special equipment and to provide to a household or a place of business rather than to individually produce the resources. Accordingly, a company managing equipment producing these resources installs a meter in a consuming place to measure an amount of resource provided to the consuming place and charges a rate according to a measured value. When there are many meters installed in consuming places, it is inappropriate that a person (i.e., a meter man) checks measured values and states of meters one by one to charge rates because of personnel expenditure and inaccurate meter reading. To solve these problems, various remote meter-reading systems have been proposed.

In a conventional remote meter-reading system, a wireless modem for remote meter-reading receives a measured value from an electronic meter at a predetermined time, packetizes the measured value into a predetermined format, and transmits packets to a remote meter-reading server through a backbone network such as a mobile communication network. However, in one-sided communication using such packet data transmission, the packets may not be transmitted to the remote meter-reading server due to a fault such as a poor state of the mobile communication network.

Remote meter-reading may not be accurately performed due to such fault, thereby decreasing reliability of the remote meter-reading system. This may be a serious blow to spread of the remote meter-reading system.

DISCLOSURE OF THE INVENTION

The present invention provides a remote meter-reading system and method using duplicate transmission in which a value measured by an electronic meter is transmitted to a remote meter-reading server using both of packet data transmission and circuit data transmission, thereby allowing the remote meter-reading server to always retain accurate data in managing meter-reading information.

According to an aspect of the present invention, there is provided a remote meter-reading method using duplicate transmission via packet data transmission and circuit data transmission. The remote meter-reading method includes (a) a wireless remote meter-reading modem reading meter-reading data from an electronic watt-hour meter when a predetermined meter-reading time is encountered; (b) the wireless remote meter-reading modem packetizing the meter-reading data and unique ID information of the electronic watt-hour meter into a predetermined format and transmitting them to a remote meter-reading server through a mobile communication network; (c) the remote meter-reading server receiving and managing the meter-reading data from the electronic watt-hour meter and checking whether there is any data that has not been received; (d) when there is data that has not been received within a predetermined time, the remote meter-reading server managing a front end processor (FEP) to set a line to the wireless remote meter-reading modem corresponding to the data that has not been received according to the circuit data transmission; (e) if the setting of the line succeeds, the wireless remote meter-reading modem reading necessary meter-reading data from electronic watt-hour meter in response to a command of the remote meter-reading server; and (f) if the reading of the data succeeds, the wireless remote meter-reading modem transmitting the necessary meter-reading data to the remote meter-reading server through the previously set line.

According to another aspect of the present invention, there is provided a remote meter-reading system for measuring data including an amount of used resource provided to a consuming place and an operating state of a meter in a remote place and transmitting the data to a remote meter-reading server using a duplicate data transmission via packet data transmission and circuit data transmission. The remote meter-reading system includes an electronic meter which measures an amount of resource used in a consuming place, stores the amount of the used resource in an internal memory, and transmits meter-reading data stored in the internal memory in response to a meter-reading data transmission command; a wireless remote meter-reading modem which receives meter-reading data acquired at predetermined intervals in a predetermined duration starting from a reference time from the electronic meter if a predetermined meter-reading time is encountered, packetizes the meter-reading data and unique ID information of the electronic meter, transmits the packetized meter-reading data and unique ID information to the remote meter-reading server through a mobile communication network, sets a channel in response to a request to set a call through the mobile communication network, reads necessary data from the electronic meter in response to a command received from the remote meter-reading server through the channel, and transmits the necessary data to the remote meter-reading server through the channel; the mobile communication network comprising a plurality of base stations, a switching unit, and a network inter-working unit (e.g., Inter-Working Function (IWF) in Code Division Multiple Access (CDMA) communication) for connection with Internet to support the packet data transmission and comprising a plurality of base stations and the switching unit to support the circuit data transmission; Internet which is connected with the network inter-working unit and relays the meter-reading data from the mobile communication network to the remote meter-reading server; a wireless front end processor (FEP) modem which is connected with an FEP and sets a line to the wireless remote meter-reading modem through the mobile communication network for the circuit data transmission; the FEP which is connected with the wireless remote meter-reading modem through the mobile communication network and the Internet according to the packet data transmission, is connected with the wireless remote meter-reading modem through the wireless FEP modem according to the circuit data transmission, automatically initializes the wireless FEP modem after meter-reading to prevent the wireless FEP modem from being hung up, and generates and sends a warning message to an administrator when meter-reading data is corrupted due to noise or distortion in the wireless FEP modem or a line used to acquire the meter-reading data; and a remote meter-reading server which is connected with the FEP through a local area network (LAN), manages the meter-reading data transmitted using the packet data transmission, checks whether there is any data that has not been received, sets a line to the wireless remote meter-reading modem corresponding to the data that has not been received, requests and receives the data that has not been received through the set line.

BEST MODE FOR CARRYING OUT THE INVENTION

Hereinafter, embodiments of a remote meter-reading system using duplicate transmission via packet data transmission and circuit data transmission according to the present invention will be described in detail with reference to the attached drawings.

Figure 1:
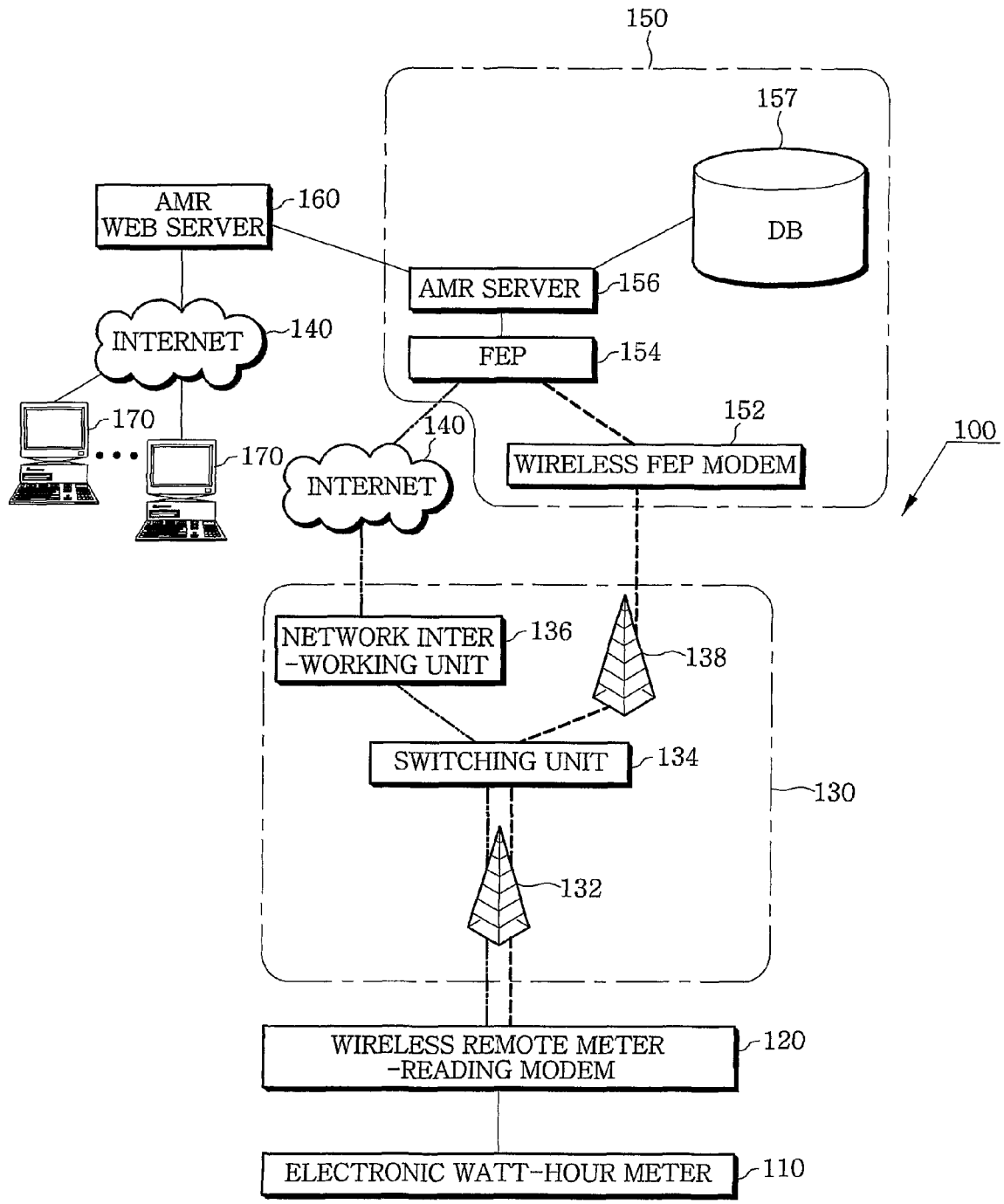
FIG. 1 illustrates an entire structure of a remote meter-reading system according to an embodiment of the present invention.

FIG. 1 illustrates an entire structure of a remote meter-reading system 100 using both of packet data transmission and circuit data transmission according to an embodiment of the present invention. The remote meter-reading system 100 includes an electronic watt-hour meter 110, a wireless remote meter-reading modem 120, a mobile communication network 130, Internet 140, a front end processor (FEP) 154, a wireless FEP modem 152, an automatic meter-reading (AMR) server 156, i.e., a remote meter-reading server, an AMR web server 160, and a personal computer (PC) 170.

The electronic watt-hour meter 110 measures the amount of electricity used in a consuming place and stores it in internal memory in a digital format. Upon receiving a meter-reading data transmission command, the electronic watt-hour meter 110 transmits meter-reading data (i.e., the amount of used electricity) stored in the internal memory and a unique ID of the consuming place. It will be easily understood by those skilled in the art that the electronic watt-hour meter 110 may be replaced by any one of other various electronic meters such as an electronic water meter and an electronic gas meter without changing the fundamental idea of the present invention.

The wireless remote meter-reading modem 120 communicates with the electronic watt-hour meter 110 using RS-232C communication according to a predetermined schedule and functions as a relay by transmitting the meter-reading data acquired from the electronic watt-hour meter 110 at predetermined intervals of, for example, 15, 30, or 60 minutes, in a predetermined duration starting from a reference time and the unique ID received from the electronic watt-hour meter 110 to the AMR server 156 through the mobile communication network 130. The wireless remote meter-reading modem 120 packetizes the meter-reading data and the unique ID into a predetermined format before transmitting them. In addition, the wireless remote meter-reading modem 120 sets a line to the FEP 154 by calling the FEP 154, thereby providing circuit data service. Such circuit data service function includes setting a hardware reset period, automatically resetting hardware with the hardware reset period, and resetting the hardware through remove control in a remote place. The hardware reset period may be set to 1 hour as a default and may be limited to a minimum of 15 minutes and a maximum of 24 hours with 96 steps. The wireless remote meter-reading modem 120 opens communication using an encrypted authentication code for communication security when providing the circuit data service and reads the electronic watt-hour meter 110 using the encrypted authentication code. A connection relationship between the electronic watt-hour meter 110 and the wireless remote meter-reading modem 120, and the appearance and internal structure of the wireless remote meter-reading modem 120 will be described in detail with reference to FIGS. 2 through 4 later.

The mobile communication network 130 includes base stations 132 and 138, a switching unit 134, and a network inter-working unit 136 and exchanges data between the wireless remote meter-reading modem 120 and the FEP 154 using the packet data transmission and the circuit data transmission. In other words, in the packet data transmission, a packet is transmitted from the wireless remote meter-reading modem 120 to the FEP 154 via the mobile communication network 130 and the Internet 140, where the packet is transmitted via the base station 132, the switching unit 134, and the network inter-working unit 136 within the mobile communication network 130. The network inter-working unit 136 supports a wireless data transmit/receive protocol that inter-works with a terminal adaptor function (TAF) that is a data service communication protocol function. Meanwhile, in the circuit data transmission, a line that guarantees an exclusive use of a particular channel is set on a path between the wireless remote meter-reading modem 120 and the wireless FEP modem 152 via the base station 132 at a side of the wireless remote meter-reading modem 120, the switching unit 134, and the base station 138 at a side of the wireless FEP modem 152, and data is exchanged through the line.

In terms of data transfer channel setting and maintenance in wireless sections between the wireless remote meter-reading modem 120 and the base station 132 and between the wireless FEP modem 152 and the base station 138 and data transfer channel setting and maintenance in a wired section between the base stations 132 and 138 via the switching unit 134, if a call is set initially, a channel that has already been set between the wireless remote meter-reading modem 120 and the wireless FEP modem 152 is maintained in the circuit data transmission even when there is no data to be transmitted. However, in the packet data transmission, when there is no data to be continuously transmitted after a call is set initially, channels are automatically released after a predetermined period of time. When data to be transmitted is generated again, a wireless channel and a wired channel are similarly reset to those set at the initial call. At this time, this situation is not recognized by a user. Accordingly, the packet data transmission is more advantageous than the circuit data transmission in that wireless channels can be efficiently used according to traffic.

The FEP 154 is connected with the Internet 140 and can include a maximum of 4 communication processing modules each of which can accommodate a maximum of 16 dial-up lines. The FEP 154 supports a Transmission Control Protocol/Internet Protocol (TCP/IP), a Serial Line IP (SLIP), a Point-to-Point Protocol (PPP), and an asynchronous protocol. The FEP 154 acquires meter-reading data from the electronic watt-hour meter 110 through a remote dial-up modem using the TCP/IP, thereby minimizing problems that may be caused by faults in communication equipment and lines. In addition, the FEP 154 monitors the states of individual ports, thereby accurately and quickly detects causes of the problems. The FEP 154 also automatically initializes the remote dial-up modem after meter-reading, thereby preventing the modem from being hung up. The FEP 154 immediately sends a warning message to an administrator when meter-reading data is corrupted due to noise or distortion in the modem or the line used to acquire the meter-reading data.

The wireless FEP modem 152 is connected with the base station 138 in the mobile communication network 130. The wireless FEP modem 152 functions as a relay by receiving wireless data from the base station 138 and transmitting it to the FEP 154 or receiving wireless data from the FEP 154 and transmitting it to the mobile communication network 130.

The AMR server 156 is connected with the FEP 154 through a Local Area Network (LAN) 150. The AMR server 156 manages a database (DB) 157, transmits and receives consumer information and meter-reading data to and from a billing system (not shown), and manages meter-reading data received from the FEP 154.

The AMR server 156 stores and manages meter-reading data transmitted using packet data transmission in the DB 157 and verifies whether data to be received is present. If the data to be receives is present, the AMR server 156 requests through the FEP 154 the wireless remote meter-reading modem 120 to set a line according to the circuit data transmission in order to receive necessary meter-reading data. During this procedure, if the wireless remote meter-reading modem 120 is inaccessible or cannot read meter-reading data from the electronic watt-hour meter 110, a warning message reporting this situation is created and transmitted to the AMR server 156. The AMR server 156 sends the warning message to the administrator.

The AMR web server 160 is connected with the AMR server 156. The AMR web server 160 receives meter-reading information and billing information that are managed by the AMR server 156 and provides web service to the PC 170 of the user through the Internet 140.

Figure 2:
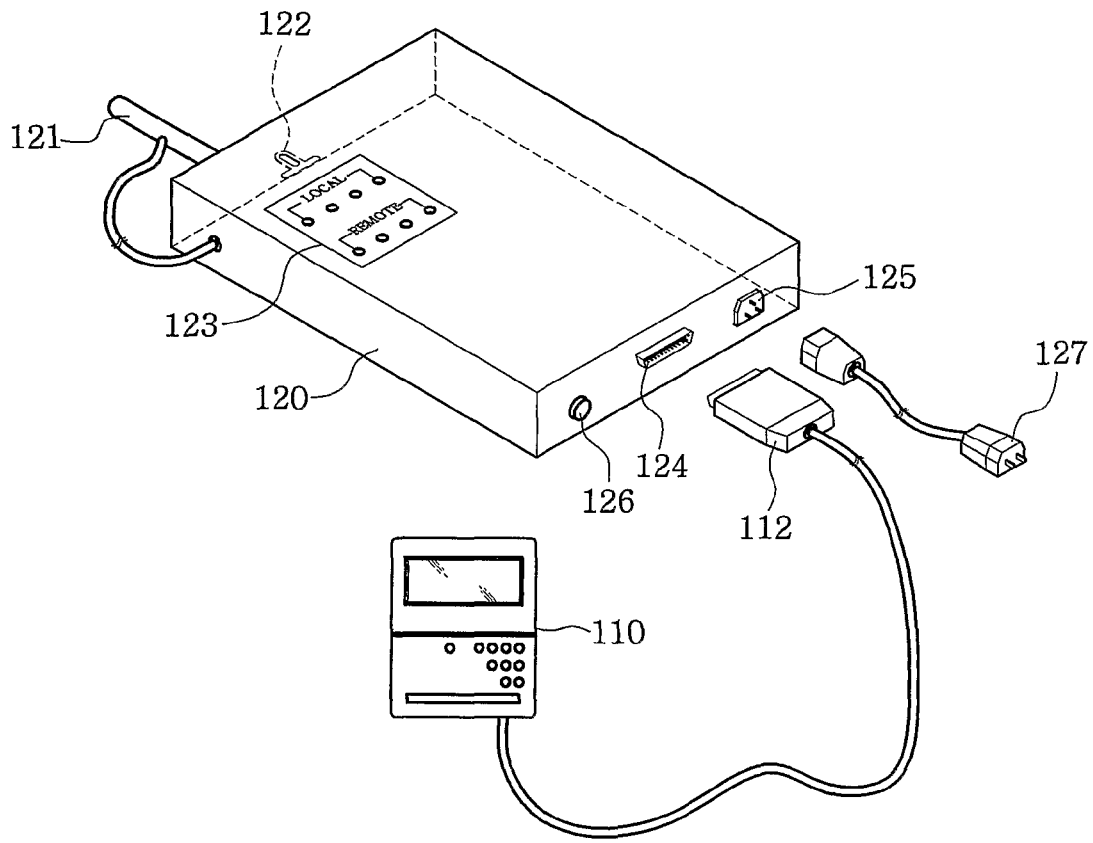
FIG. 2 illustrates a connection relationship between an electronic watt-hour meter and a wireless remote meter-reading modem.

FIG. 2 illustrates a connection relationship between the electronic watt-hour meter 110 and the wireless remote meter-reading modem 120. The electronic watt-hour meter 110 and the wireless remote meter-reading modem 120 are connected with each other using an RS-232C connection port 124. The wireless remote meter-reading modem 120 includes a power connector 125 to supply power needed for operation. When a power cable 127 is connected with the power connector 125 and then a plug is connected with a power supply (for example, 110/220V AC (alternating current)), the wireless remote meter-reading modem 120 is operated. In an embodiment of the present invention, the RS-232C connection port 124 is used to connect the electronic watt-hour meter 110 and the wireless remote meter-reading modem 120. However, data may be transferred therebetween using optical communication (e.g., infrared communication).

RS-232C is a standard published in 1969 as a revised version of RS-232B and then improved and permitted in 1981 by Electronic Industries Association (EIA). The RS-232C standard is functionally compatible with a connection standard using ISO2110 (defining a 25-pin connector and arrangement of pins) in V.24 (defining an interface circuit between data terminal equipment (DTE) and data communication equipment (DCE) and the meaning of pin numbers and circuits) and V.28 (formally titled "Electrical Characteristics for Unbalanced Double-Current Interchange Circuits") among CCITT recommendations.

Figure 3:
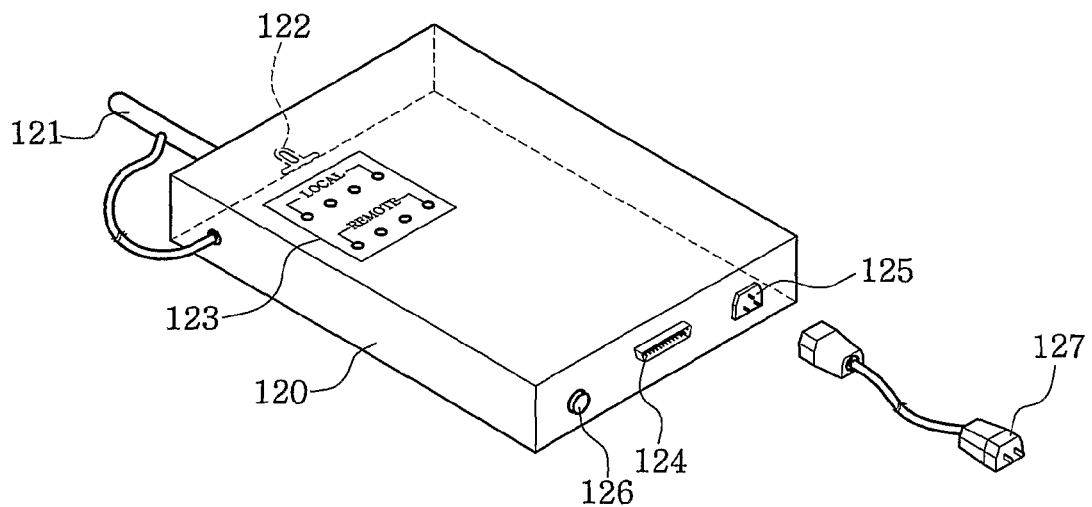
FIG. 3 illustrates an appearance of a wireless remote meter-reading modem according to an embodiment of the present invention.

FIG. 3 is a perspective view of the wireless remote meter-reading modem 120. The wireless remote meter-reading modem 120 includes an antenna 121, a hanger 122, an operation display portion 123, a connection port 124, a power connector 125, a reset switch 126, and a power cable 127.

The antenna 121 is for wireless communication and has a magnet on its bottom so that the antenna 121 can be attached to a main body of the wireless remote meter-reading modem 120. The antenna 121 also has an antenna line long enough to be attached to any position on the main body of the wireless remote meter-reading modem 120. The hanger 122 allows the wireless remote meter-reading modem 120 to be installed on a wall. The wireless remote meter-reading modem 120 may be fixed on the wall in a consuming place by hooking the wireless remote meter-reading modem 120 on a screw driven on the wall through the hanger 122. The operation display part 123 is positioned on a front panel of the wireless remote meter-reading modem 120 and displays an operation state of the wireless remote meter-reading modem 120. The operation display portion 123 includes 8 light emitting diodes (LEDs).

The operation display portion 123 is largely divided into a local section and a remote section. The local section includes a T×D indicating data transmitted to the electronic watt-hour meter 110, an R×D indicating data received from the electronic watt-hour meter 110, and a DTR indicating a state of connection with the electronic watt-hour meter 110. The remote section includes a T×D indicating data transmitted to the mobile communication network 130, an R×D indicating data received from the mobile communication network 130, a SYNC indicating a wireless communication state of the wireless remote meter-reading modem 120, an STA indicating an operation state of the wireless remote meter-reading modem 120, and a PWR indicating a power state of the wireless remote meter-reading modem 120. The connection port 124 connects the wireless remote meter-reading modem 120 to the electronic watt-hour meter 110 and allows data communication therebetween. The connection port 124 is a standard connector of an RS-232C 25-pin female type or an RS-232C 9-pin female type. Each pin's name and function complies with the RS-232C standard, and thus a description thereof will be omitted. The power connector 125 connects with the power cable 127 to supply the power to the wireless remote meter-reading modem 120. The power cable 127 has a plug for 220 V. An operating voltage for the wireless remote meter-reading modem 120 is 110/220 V AC. The reset switch 126 is provided to manually initialize the wireless remote meter-reading modem 120. When the reset switch 126 is closed for a predetermined period of time (e.g., 1 second) and is then opened to restart the wireless remote meter-reading modem 120, the wireless remote meter-reading modem 120 is initialized.

Figure 4:
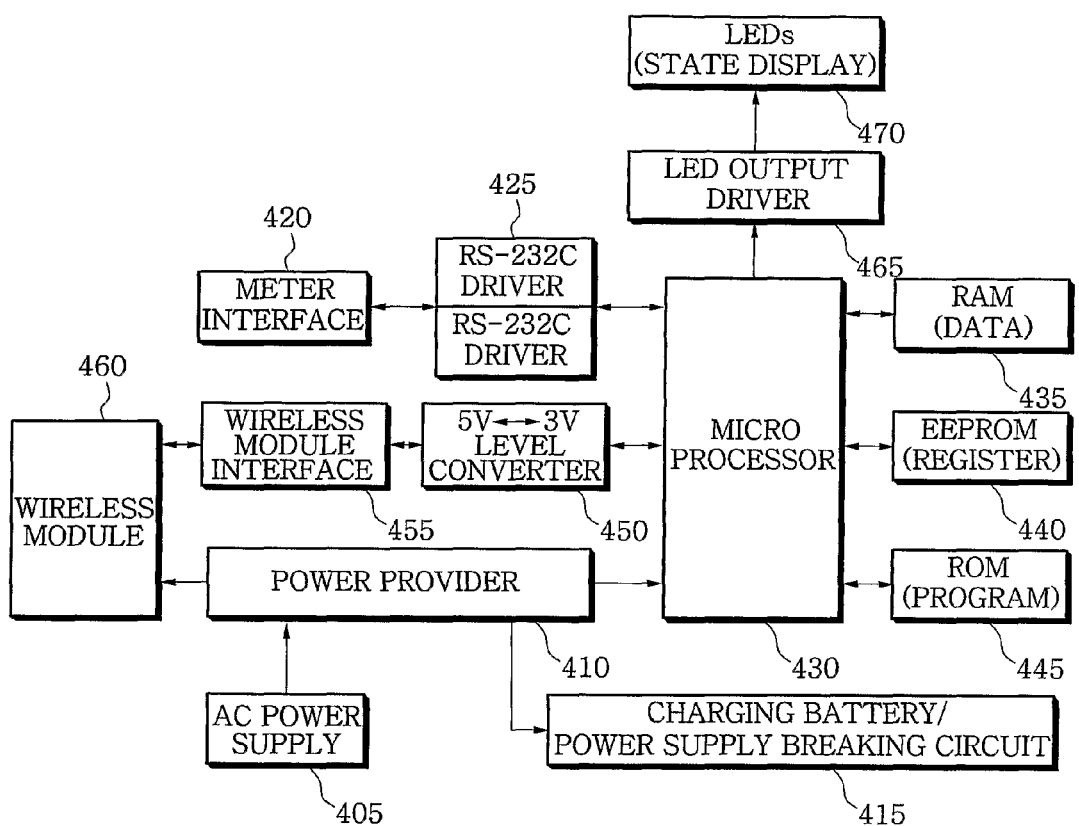
FIG. 4 illustrates an internal structure of a wireless remote meter-reading modem according to an embodiment of the present invention.

FIG. 4 is a block diagram of an internal structure of a wireless remote meter-reading modem according to an embodiment of the present invention. The wireless remote meter-reading modem includes an AC power supply 405, a power provider 410, a charging battery/power supply breaking circuit 415, a meter interface 420, an RS-232C driver 425, a microprocessor 430, a RAM (random access memory) 435, an EEPROM (electrically erasable programmable read-only memory) 440, a ROM 445, a 5V/3V level converter 450, a wireless module interface 455, a wireless module 460, an LED output driver 465, and LEDs 470.

The power provider 410 receives power from the AC power supply 405 through the power connector 125 and provides power needed for operation to the charging battery/power supply breaking circuit 415, the microprocessor 430, and the wireless module 460. The charging battery/power supply breaking circuit 415 is connected with the power provider 410. The charging battery/power supply breaking circuit 415 receives the power from the power provider 410, charges a backup power to prepare for a case where power supply is interrupted, operates with power of a charging battery when the power supply is interrupted to transmit information for which the power supply is interrupted to the AMR server in a form of packet data, and then breaks the power to the charging battery.

The meter interface 420 performs a buffering function to adjust the operation speed and timing of the electronic watt-hour meter 110 and the wireless remote meter-reading modem 120 and performs data conversion to allow the electronic watt-hour meter 110 and the wireless remote meter-reading modem 120 to communicate with each other. The RS-232C driver 425 is connected with the meter interface 420 and is a port that receives and outputs data in series according to the V.24 standard. The RS-232C driver 425 allows the microprocessor 430 to easily operate in association with other peripheral devices using a synchronous or an asynchronous protocol.

The microprocessor 430 is connected with the power provider 410 and the RS-232C driver 425 and operates with the power provided from the power provider 410. The microprocessor 430 receives meter-reading data and a unique ID of the electronic watt-hour meter 110 from the RS-232C driver 425 and instructs to store them. The microprocessor 430 also instructs to transmit data requested from the AMR server 156 through the wireless module 460 and controls the operating states (e.g., a connection state and a communication state) of the wireless remote meter-reading modem 120 to be displayed. In addition, when power supply is interrupted, the microprocessor 430 detects this interruption and instructs to transmit power interruption information to the predetermined AMR server 156. The microprocessor 430 is connected with the RAM 435 that stores various parameters and data produced while a program is executed, the EEPROM 440 that stores important data (e.g., an AMR server IP address and the unique ID of the electronic watt-hour meter 110) which should not be lost when the power supply is interrupted in a register, and the ROM 445 that stores the program executing operations of the wireless remote meter-reading modem 120.

The 5V/3V level converter 450 is connected with the microprocessor 430. The 5V/3V level converter 450 converts an operating power (e.g., 3 V) for data from the wireless module 460 through the wireless module interface 455 into an operating power (e.g., 5 V) that can be processed by the microprocessor 430, and conversely, converts an operating power (e.g., 5 V) for data from the microprocessor 430 into an operating power (e.g., 3 V) that can be processed by the wireless module 460. The wireless module interface 455 adjusts the operation speed and timing of data transferred between the wireless module 460 and the microprocessor 430. The wireless module 460 is connected with the power provider 410 and the wireless module interface 455 and operates with the power provided from the power provider 410.

The wireless module 460 converts data received from the wireless module interface 455 into a radio frequency suitable to transmission and transmits the radio frequency to the base station 132 included in the mobile communication network 130 through a transmitting/receiving antenna. In addition, the wireless module 460 receives a radio frequency transmitted from the base station 132 included in the mobile communication network 130 through the transmitting/receiving antenna, restores a bit data stream from the radio frequency, and transmits the bit data stream to the wireless module interface 455.

The LED output driver 465 is connected with the microprocessor 430. The LED output driver 465 receives an LED driving signal from the microprocessor 430 and drives an LED 470 corresponding to the LED driving signal. The LED driving signal is divided into 8 signals (e.g., for 4 LEDs in the local section and 4 LEDs in the remote section) to display various operation states of the wireless remote meter-reading modem 120.

Hereinafter, embodiments of a remote meter-reading method using duplicate transmission via packet data transmission and circuit data transmission according to the present invention will be described in detail with reference to the attached drawings.

Figure 5:
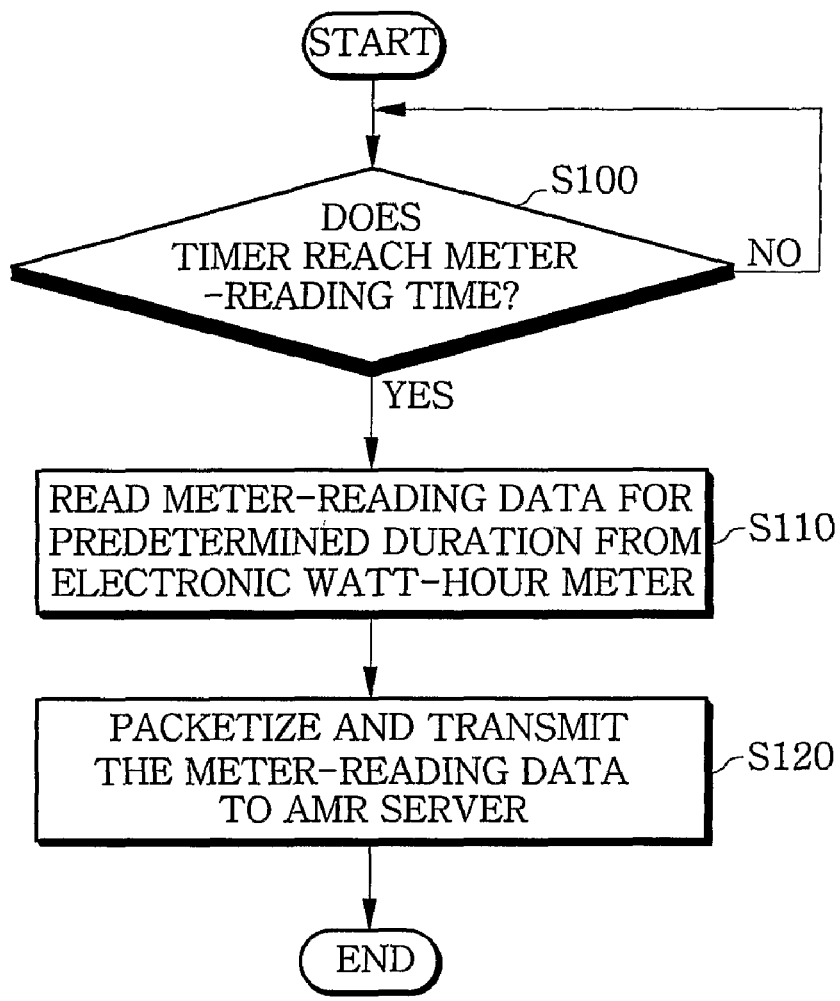
FIG. 5 is a flowchart of packet data transmission in a remote meter-reading method according to an embodiment of the present invention.
Figure 6:
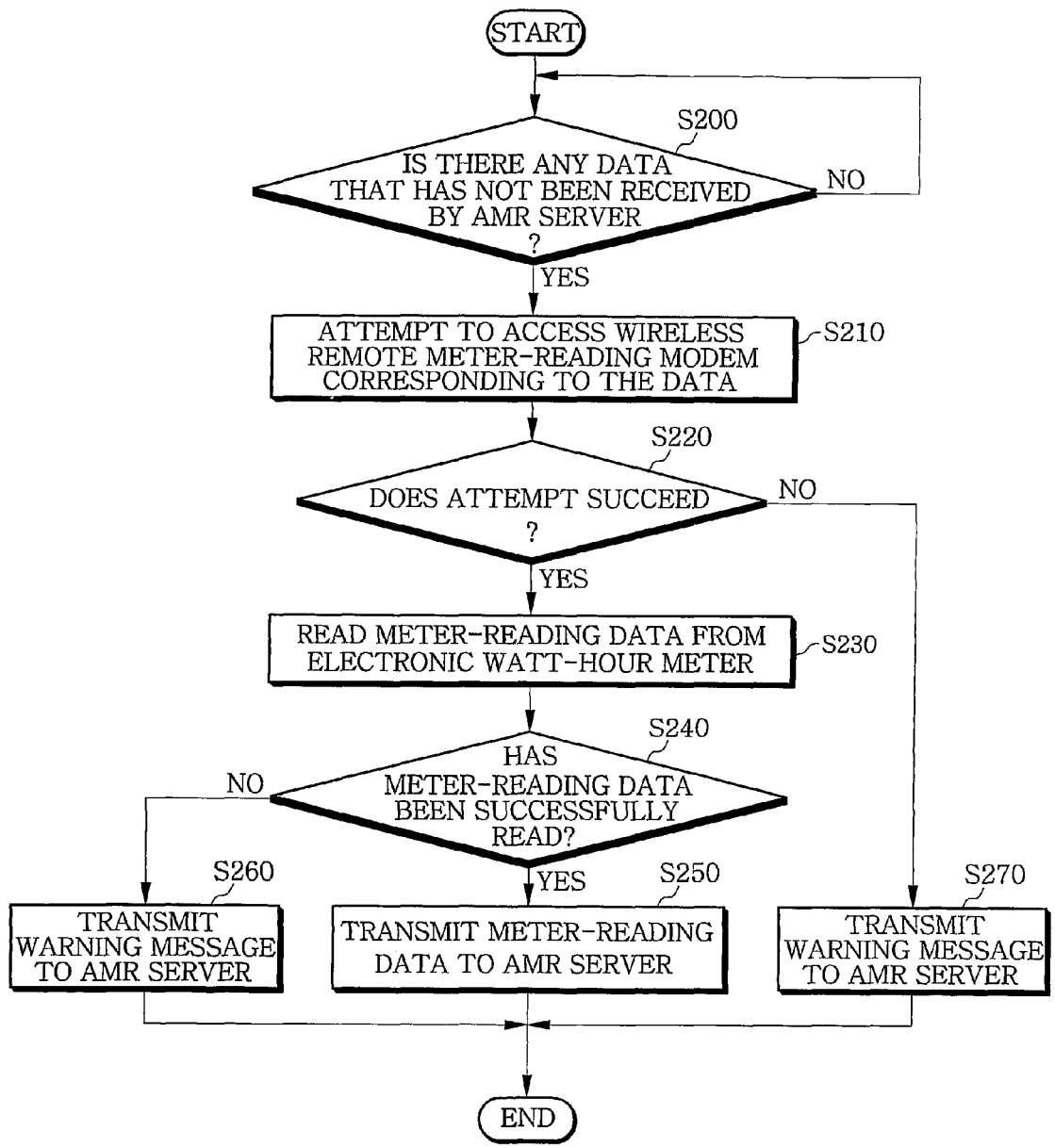
FIG. 6 is a flowchart of circuit data transmission in a remote meter-reading method according to an embodiment of the present invention.

Referring to FIG. 5, the microprocessor 430 included in the wireless remote meter-reading modem 120 checks a timer (not shown) to determine whether the timer reaches a predetermined meter-reading time in operation S100. When it is determined that the timer reaches the predetermined meter-reading time, the wireless remote meter-reading modem 120 communicates with the electronic watt-hour meter 110 according to the RS-232C standard and receives meter-reading data acquired at predetermined intervals of, for example, 15, 30, or 60 minutes, in a predetermined duration starting from a reference time from the electronic watt-hour meter 110 in operation S110. Thereafter, the wireless remote meter-reading modem 120 packetizes the meter-reading data and a unique ID received from the electronic watt-hour meter 110 into a predetermined format and transmits them to the AMR server 156 through the mobile communication network 130 in operation S120.

Meanwhile, the AMR server 156 receives the meter-reading data from one or more electronic watt-hour meters and manages the meter-reading data. In detail, the AMR server 156 determines whether there is any data that has not been received due to a fault such as a poor mobile communication network state, a poor wireless modem state, or a poor meter state within a predetermined time in operation S200. When it is determined that there is data that has not been received, the AMR server 156 finds the wireless remote meter-reading modem 120 using a unique ID corresponding to the data and manages the FEP 154 to set a line to the found wireless remote meter-reading modem 120 using circuit data transmission in operation S210. If the line is set between the wireless FEP modem 154 and the wireless remote meter-reading modem 120, the AMR server 156 provides an encrypted authentication code for authentication. Thereafter, the AMR server 156 sends a command to the wireless remote meter-reading modem 120 to read necessary meter-reading data and the wireless remote meter-reading modem 120 reads the necessary meter-reading data from the electronic watt-hour meter 110 in response to the command in operations S220 and S230. If the necessary meter-reading data has been successfully read, the wireless remote meter-reading modem 120 transmits the meter-reading data to the AMR server 156 through the previously set line in operations S240 and S250. However, when the wireless FEP modem 154 cannot access the wireless remote meter-reading modem 120 to set the line or when the wireless remote meter-reading modem 120 cannot read the meter-reading data from the electronic watt-hour meter 110, a warning message is generated and transmitted to the AMR server 156 in operations S220 and S270 or S240 and S260. The AMR server 156 reports the warning message to an administrator. Then, the administrator can check the warning message, identify abnormal equipment, and take a necessary action.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

According to the present invention, when values measured by an electronic watt-hour meter are transmitted to a remote meter reading server, meter-reading data are collected using packet data transmission in a normal state, thereby efficiently utilizing a line. Additional circuit data transmission is used in an abnormal state so that a particular electronic watt-hour meter can be intensively managed. Accordingly, since the remote meter-reading server manages the meter-reading data using duplicate transmission, accurate data can always be retained effectively.

What is claimed is:

1. A remote meter-reading method using duplicate transmission via packet data transmission and circuit data transmission, the remote meter-reading method comprising:
    (a) a wireless remote meter-reading modem reading meter-reading data from an electronic watt-hour meter when a predetermined meter-reading time is encountered;
    (b) the wireless remote meter-reading modem packetizing the meter-reading data and unique ID information of the electronic watt-hour meter into a predetermined format and transmitting them to a remote meter-reading server through a mobile communication network;
    (c) the remote meter-reading server receiving and managing the meter-reading data from the electronic watt-hour meter and checking whether there is any data that has not been received;
    (d) when there is data that has not been received within a predetermined time, the remote meter-reading server managing a front end processor (FEP) to set a line to the wireless remote meter-reading modem corresponding to the data that has not been received according to the circuit data transmission;
    (e) if the setting of the line succeeds, the wireless remote meter-reading modem reading necessary meter-reading data from electronic watt-hour meter in response to a command of the remote meter-reading server; and
    (f) if the reading of the data succeeds, the wireless remote meter-reading modem transmitting the necessary meter-reading data to the remote meter-reading server through the previously set line,
    wherein the FEP is connected with the wireless remote meter-reading modem through a wireless FEP modem according to the circuit data transmission and automatically initializes the wireless FEP modem after meter-reading to prevent the wireless FEP modem from being hung up, and generates and sends a warning message to the remote meter-reading server when meter-reading data according to the circuit data transmission is corrupted.

2. The remote meter-reading method of claim 1, wherein operation (e) comprises the remote meter-reading server providing an encrypted authentication code and the wireless remote meter-reading modem authenticating the remote meter-reading server using the authentication code.

3. A remote meter-reading system for measuring data including an amount of used resource provided to a consuming place and an operating state of a meter in a remote place and transmitting the data to a remote meter-reading server using a duplicate data transmission via packet data transmission and circuit data transmission, the remote meter-reading system comprising:
    an electronic meter which measures an amount of resource used in a consuming place, stores the amount of the used resource in an internal memory, and transmits meter-reading data stored in the internal memory in response to a meter-reading data transmission command;
    a wireless remote meter-reading modem which receives meter-reading data acquired at predetermined intervals in a predetermined duration starting from a reference time from the electronic meter if a predetermined meter-reading time is encountered, packetizes the meter-reading data and unique ID information of the electronic meter, transmits the packetized meter-reading data and unique ID information to the remote meter-reading server through a mobile communication network, sets a channel in response to a request to set a call through the mobile communication network, reads necessary data from the electronic meter in response to a command received from the remote meter-reading server through the channel, and transmits the necessary data to the remote meter-reading server through the channel;
    the mobile communication network comprising a plurality of base stations, a switching unit, and a network inter-working unit for connection with Internet to support the packet data transmission and comprising a plurality of base stations and the switching unit to support the circuit data transmission;
    Internet which is connected with the network inter-working unit and relays the meter-reading data from the mobile communication network to the remote meter-reading server;
    a wireless front end processor (FEP) modem which is connected with an FEP and sets a line to the wireless remote meter-reading modem through the mobile communication network for the circuit data transmission;
    the FEP which is connected with the wireless remote meter-reading modem through the mobile communication network and the Internet according to the packet data transmission, is connected with the wireless remote meter-reading modem through the wireless FEP modem according to the circuit data transmission, automatically initializes the wireless FEP modem after meter-reading to prevent the wireless FEP modem from being hung up, and generates and sends a warning message to an administrator when meter-reading data is corrupted due to noise or distortion in the wireless FEP modem or a line used to acquire the meter-reading data; and a remote meter-reading server which is connected with the FEP through a local area network (LAN), manages the meter-reading data transmitted using the packet data transmission, checks whether there is any data that has not been received, sets a line to the wireless remote meter-reading modem corresponding to the data that has not been received, requests and receives the data that has not been received through the set line.

* * * * *